(12) United States Patent
Vogley

(10) Patent No.: US 6,832,014 B1
(45) Date of Patent: Dec. 14, 2004

(54) BACKPLANE WIRE AND NOISE ELIMINATOR TUBE

(75) Inventor: Wilbur Christian Vogley, Cranberry Township, PA (US)

(73) Assignee: Marconi Communications, Inc., Warrendale, PA (US)

( * ) Notice: Subject to any disclaimer, the term of this patent is extended or adjusted under 35 U.S.C. 154(b) by 230 days.

(21) Appl. No.: 10/073,573

(22) Filed: Feb. 8, 2002

(51) Int. Cl.[7] ............................. G02B 6/26; G02B 6/35
(52) U.S. Cl. ......................... 385/16; 359/107; 398/43
(58) Field of Search ............................ 385/16, 17, 20, 385/22, 23

(56) References Cited

U.S. PATENT DOCUMENTS

| 4,874,218 A | * | 10/1989 | Bowen et al. ................ 385/16 |
| 5,069,521 A | * | 12/1991 | Hardwick .................... 385/24 |
| 6,088,141 A | * | 7/2000 | Merli et al. .................... 398/5 |
| 6,434,288 B1 | * | 8/2002 | Uemura et al. ............... 385/16 |
| 2002/0085802 A1 | * | 7/2002 | Boroditsky et al. .......... 385/24 |

\* cited by examiner

*Primary Examiner*—John D. Lee
*Assistant Examiner*—Jennifer Doan
(74) *Attorney, Agent, or Firm*—Ansel M. Schwartz (57) ABSTRACT

An optical switch for switching data in a network. The switch includes a housing. The switch includes a transmitter receiver means which transmits to or receives from the network the data. The transmitter receiver means is disposed in the housing. The first optical path forms a first closed optical loop along which the data flows in a first direction. The switch includes a second optical path forming a second closed optical loop along which the data flows in a second direction. The second direction is opposite the first direction. The first and second optical paths each having a portion in which the transmitter receiver means is inserted into or removed from the first and second optical paths without disruption of switching of data by the switch. A method for switching data in a network.

13 Claims, 10 Drawing Sheets

FIG.12

BACKPLANE WIRE AND NOISE ELIMINATOR TUBE

FIELD OF THE INVENTION

The present invention is related to the switching of data optically with a switch where input ports and output ports to a network can be introduced without disruption of the switching operation of the switch. The present invention is related to the switching of data optically with a switch where input ports and output ports to a network can be introduced without disruption of the switching operation with a first optical path and a second optical path transmitting data in a direction opposite to the first optical path.

BACKGROUND OF THE INVENTION

There currently exist too many high speed electrical interconnects in an ATM/MPLS switch/router. The electrical interconnects cause noise, thick backplanes, and expensive sockets that can be eliminated. The present invention saves money in regard to how it is built, saves space in the chassis, increases speed without increasing emissions, and is expandable as well as upgradeable.

SUMMARY OF THE INVENTION

The present invention pertains to an optical switch for switching data in a network. The switch comprises a housing. The switch comprises a transmitter receiver means which transmits to or receives from the network the data. The transmitter receiver means is disposed in the housing. The first optical path forms a first closed optical loop along which the data flows in a first direction. The switch comprises a second optical path forming a second closed optical loop along which the data flows in a second direction. The second direction is opposite the first direction. The first and second optical paths each having a portion in which the transmitter receiver means is inserted into or removed from the first and second optical paths without disruption of switching of data by the switch.

The present invention pertains to a method for switching data in a network. The method comprises the steps of switching the data with a switch by flowing the data along a first optical path forming a first closed optical loop along which the data flows in a first direction and along a second optical path forming a second closed optical loop along which the data flows in a second direction, the second direction being opposite the first direction. There is the step of inserting a transmitter receiver means which transmits to or receives from the network the data into the first optical path and the second optical path of the switch without disruption of switching of the data by the switch.

The present invention pertains to a switch for directing optical signals in a telecommunications network. The switch comprises an optical backplane having a first optical path along which the optical signals flow in a first direction and at least a second optical path along which optical signals flow in a second direction. The switch comprises N interfaces, where N is greater than or equal to 2 and is an integer. Each interface is in optical communication with the network. Each interface receives optical signals from and transfers optical signals to the network. Each interface in optical communication with the first path and the second path. Each interface sends optical signals it receives from the network onto the first path and the second path. Each interface transferring optical signals to the network it receives from the first path and the second path.

The present invention pertains to a method for directing the optical signals in a telecommunications network. The method comprises the steps of receiving the optical signals at a first interface of a switch. There is the step of sending the optical signals onto a first optical fiber in a first direction and a second optical fiber in a second direction of the switch from the first interface There is the step of receiving at a second interface of the switch the optical signals from the first fiber and the second fiber There is the step of transferring the optical signals from the second interface to a desired destination. Preferably, the method includes the steps of removing an optical connector in communication with the first optical fiber and the second optical fiber from a first slot of a chassis of the switch. There is the step of inserting a third interface into the first slot so it communicates with the first fiber and the second fiber.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
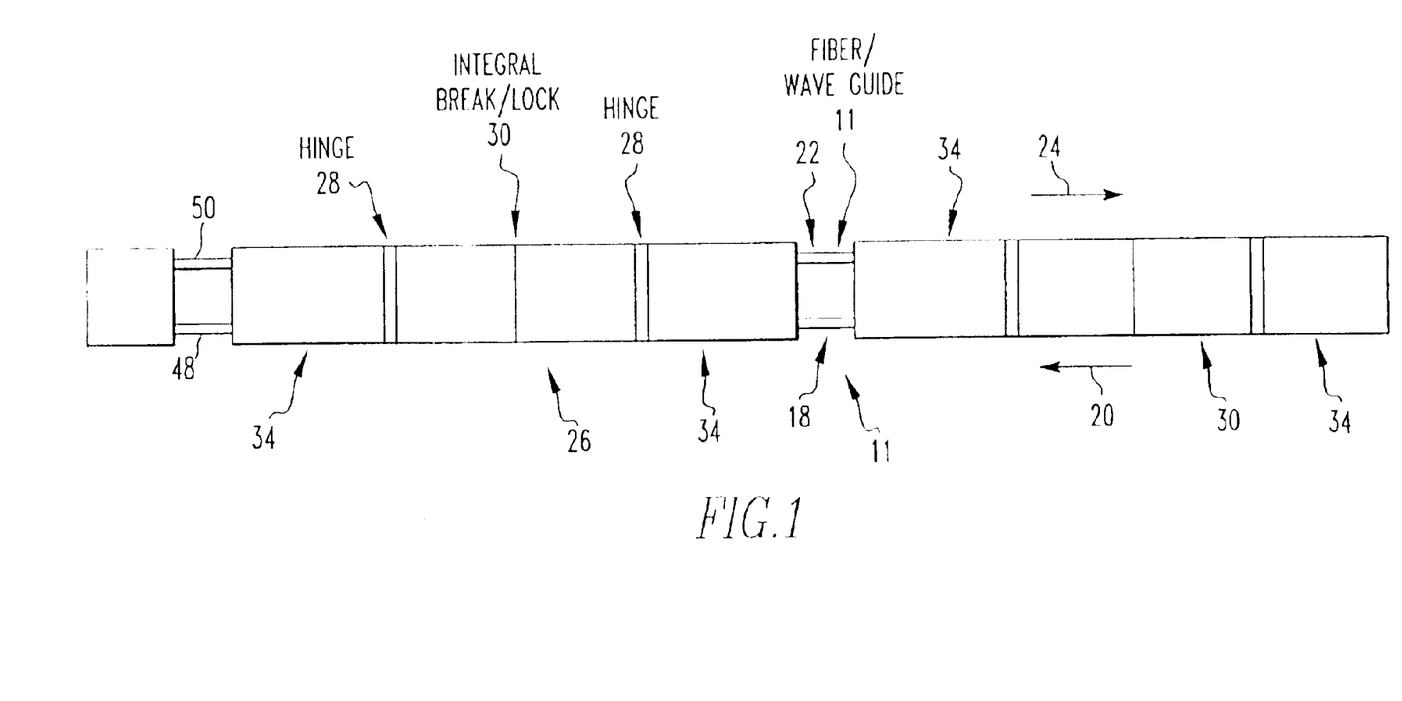
FIG. 1 is a schematic representation of a portion of the first optical path and the second optical path having an integral break/lock.
Figure 2A:
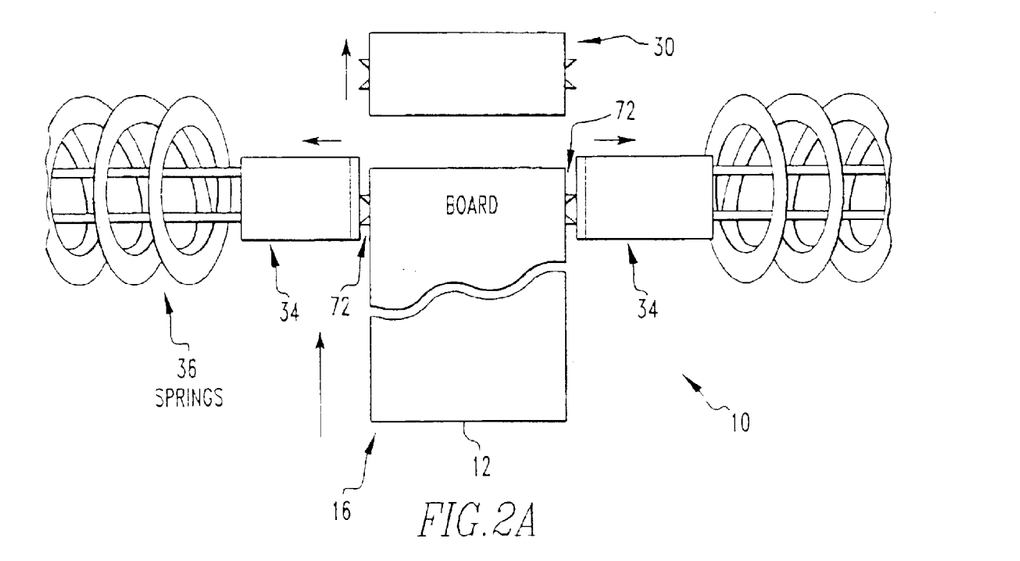
FIGS. 2a and 2b are schematic representations of the first and second optical paths showing springs about the feeds with an integral break/lock, or a board printed circuit board assembly in place of the integral break/lock, respectively.
Figure 2B:
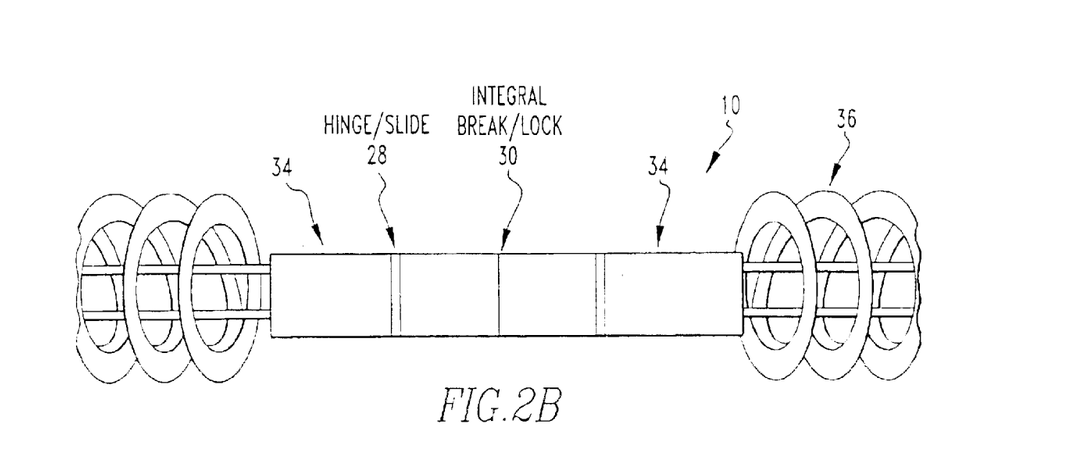
Figure 3:
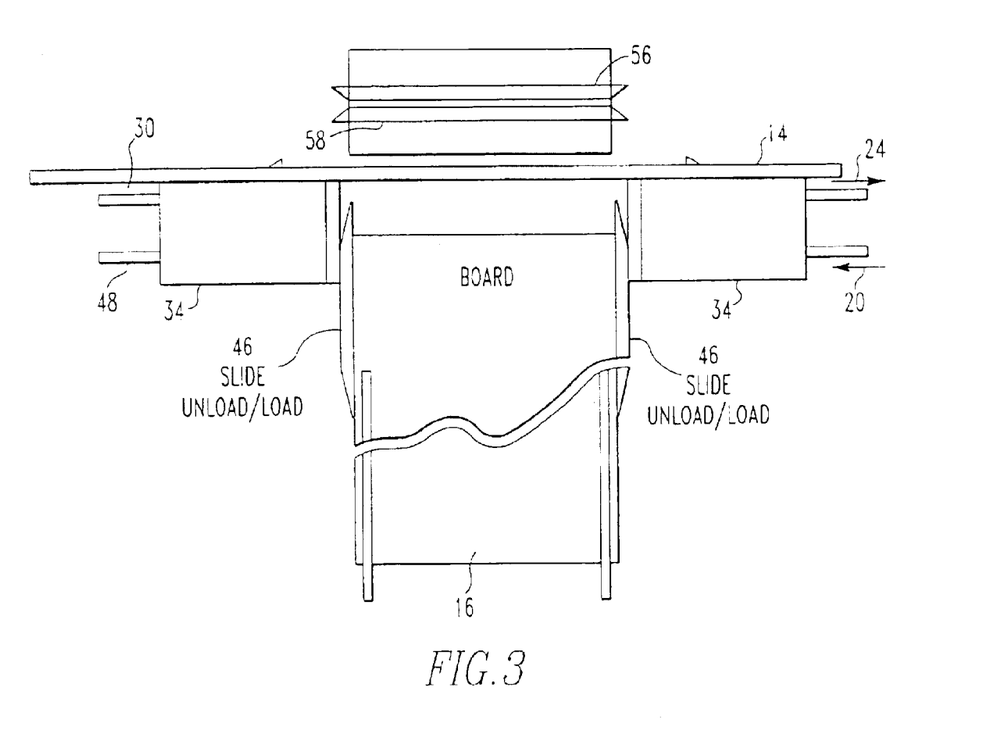
FIG. 3 is a schematic representation of a portion of the first and second optical paths with the printed circuit board assembly replacing the integral break/lock.

Referring now to the drawings wherein like reference numerals refer to similar or identical parts throughout the several views, and more specifically to FIGS. 1 and 2 thereof, there is shown an optical switch 10 for switching data in a network 12. The switch 10 comprises a housing, as shown in FIG. 3. The housing can be, for instance, a chassis 14. The switch 10 comprises a transmitter receiver means 16 which transmits to or receives from the network 12 the data. The transmitter receiver means 16 is disposed in the housing. The first optical path 18 forms a first closed optical loop along which the data flows in a first direction 20 The switch 10 comprises a second optical path 22 forming a second closed optical loop along which the data flows in a second direction 24. The second direction 24 is opposite the first direction 20. The first and second optical paths 18, 22 each having a portion 26 in which the transmitter receiver means 16 is inserted into or removed from the first and second optical paths 18, 22 without disruption of switching of data by the switch 10.

Preferably, the portion 26 includes hinges/slides and an integral break/lock 30 which fits into the hinges/slides. The portion 26 preferably includes sides 32 and includes feeds 34 on each side 32 to which the first and second paths connect. The feeds 34 are movable to be spread apart or closed together to allow the integral break/lock 30 or the transmitter receiver means 16 to be inserted or removed from the first and second optical paths 18, 22.

Preferably, each feed 34 has one of the hinges/slides. Each feed 34 preferably has a spring 36 to which it is mounted. The spring 36 is attached to the housing against which the feed 34 is spread and then forced back. Preferably, the transmitter receiver means 16 includes a printed circuit board 38 assembly having a transmitter 40 and receiver 42 for transmitting and receiving the data.

Figure 4:
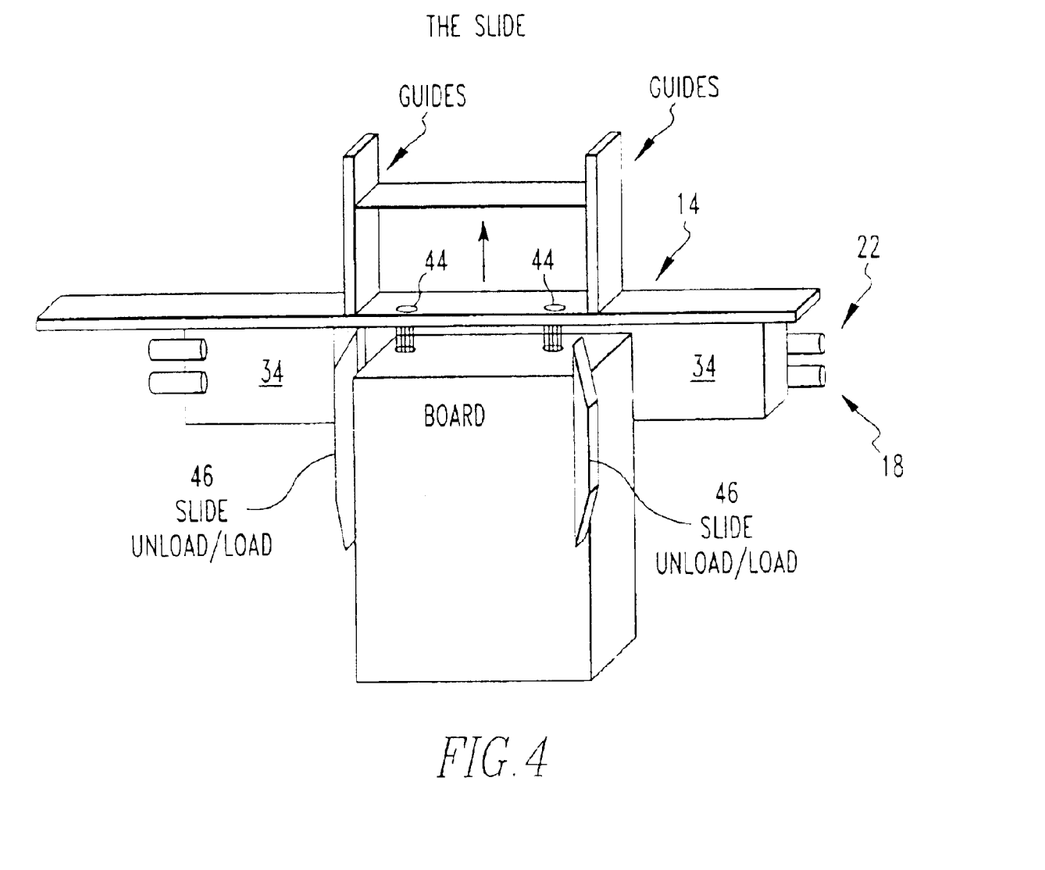
FIG. 4 is a schematic representation of a portion of the first and second optical paths showing the printed circuit board assembly being placed therein.

The board 38 preferably has locator pins 44, as shown in FIG. 4, which align the board 38 into proper placement into the housing so the transmitter 40 and receiver 42 communicate with the first and second optical paths 18, 22 and the first and second optical paths 18, 22 extend through the board 38. Preferably, the board 38 includes unload/load slides 46 on each side 32 of the board 38 which fit into the hinges/slides on each feed 34. The first optical path 18 preferably includes a first optical fiber 48. The second optical path 22 includes a second optical fiber 50. The board 38 includes a first optical fiber segment 52 and a second optical fiber segment 54 which align with the first optical fiber 48 and the second optical fiber 50, respectively, when the board 38 is in place in the housing, and the integral break/lock 30 has a third optical fiber segment 56 and a fourth optical fiber segment 58 which aligns with the first optical fiber 48 and the second optical fiber 50, respectively, when the integral break/lock 30 is in place in the housing.

Figure 5:
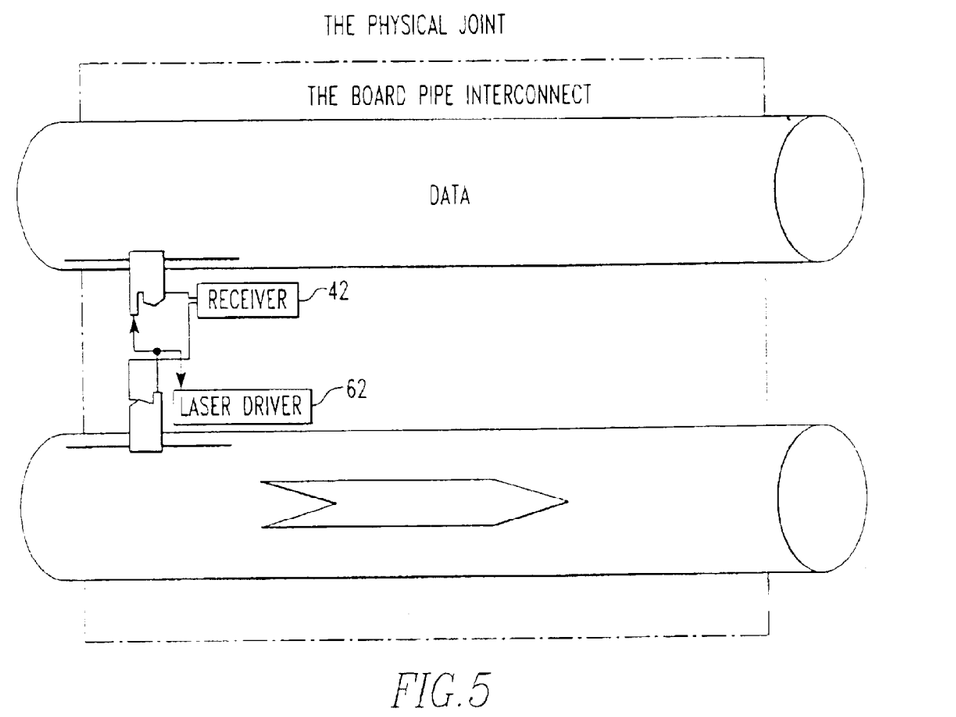
FIG. 5 is a schematic representation showing the printed circuit board assembly interconnect with the first and second optical paths.
Figure 6:
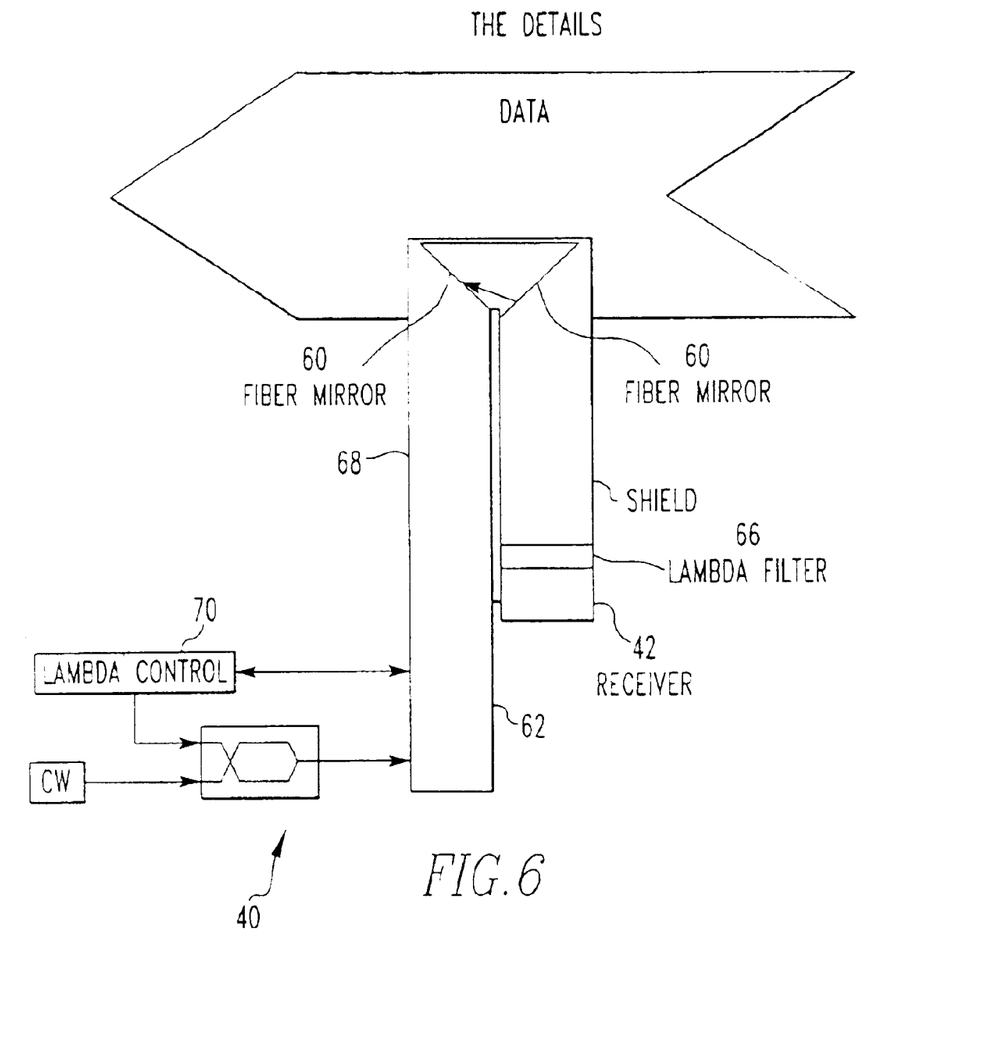
FIG. 6 is a schematic representation of the transmitter and receiver of the printed circuit board assembly connected to an optical fiber of an optical path.

Preferably, the switch 10 includes an optical gel 72 placed at connection points between the first optical fiber 48 and the first optical fiber segment 52 and the second optical fiber 50 and the second optical fiber segment 54. Preferably, the board 38 includes a fiber mirror 60 and the transmitter 40 includes a laser 62 driver and a fiber drive 64 connected to the fiber mirror 60 and the laser 62, as shown in FIGS. 5 and 6. The board 38 preferably includes a frequency filter 66 connected to the receiver 42 and a fiber drop 68 connected to the frequency filter 66 and the mirror 60. Preferably, the board 38 includes a frequency control 70 connected to the laser 62.

The present invention pertains to a method for switching data in a network 12. The method comprises the steps of switching the data with a switch 10 by flowing the data along a first optical path 18 forming a first closed optical loop along which the data flows in a first direction 20 and along a second optical path 22 forming a second closed optical loop along which the data flows in a second direction 24, the second direction 24 being opposite the first direction 20, as shown in FIGS. 1–3. There is the step of inserting a transmitter receiver means 16 which transmits to or receives from the network 12 the data into the first optical path 18 and the second optical path 22 of the switch 10 without disruption of switching of the data by the switch 10.

Preferably, the step of inserting includes the step of inserting the transmitter receiver means 16 along hinges/slides into the first and second optical paths 18, 22. There is preferably the step of removing an integral break/lock 30 from the first and second optical paths 18, 22 along the hinges/slides in which the integral break/lock 30 fits. Preferably, there is the step of the spreading apart movable feeds 34 having the hinges/slides and the first and second paths to allow the integral break/lock 30 or the transmitter receiver means 16 to be inserted or removed from the first and second optical paths 18, 22. The spreading step preferably includes the step of moving the feeds 34 apart again springs 36 connected to a housing of the switch 10 and the feeds 34. Preferably, there is the step of releasing the feeds 34 against the transmitter receiver means 16 which are held against the transmitter receiver means 16 by the springs 36.

There is preferably the step of fitting an unload/load slide 46 disposed on each side 32 of a printed circuit board 38 assembly into the hinge/slide 28 on each feed 34. Preferably, as shown in FIG. 4, there is the step of aligning locator pins 44 of the board 38 with alignment holes in the housing for proper placement of the board 38 into the housing so a transmitter 40 and a receiver 42 of the board 38 can communicate with the first and second optical paths 18, 22 and the first and second optical paths 18, 22 extend through the board 38, the transmitter 40 and receiver 42 for transmitting and receiving the data, respectively.

The aligning step preferably includes the step of aligning a first optical fiber 48 of the first path and a second optical fiber 50 of the second path with a first optical fiber segment 52 of the board 38 and a second optical fiber segment 54 of the board 38, respectively. Preferably, there is the step of placing an optical gel 72 at connection points between the first optical fiber 48 and the second optical fiber segment 54, and the second optical fiber 50 and the second optical fiber segment 54.

The present invention pertains to a switch 10 for directing optical signals in a telecommunications network 12, as shown in FIGS. 1–3. The switch 10 comprises an optical backplane 11 having a first optical path 18 along which the optical signals flow in a first direction 20 and at least a second optical path 22 along which optical signals flow in a second direction 24. The switch 10 comprises N interfaces, where N is greater than or equal to 2 and is an integer. Each interface is in optical communication with the network 12. Each interface receives optical signals from and transfers optical signals to the network 12. Each interface in optical communication with the first path and the second path. Each interface sends optical signals it receives from the network 12 onto the first path and the second path. Each interface transferring optical signals to the network 12 it receives from the first path and the second path. An interface can be, for instance a printed circuit board 38 assembly.

Preferably, the first path forms a closed continuous loop and the second path forms a closed continuous loop. The first path preferably includes a first optical fiber 48 and the second path includes a second optical fiber 50. Preferably, the switch 10 includes optical connectors through which optical signals from the first fiber and the second fiber can flow and a chassis 14 having slots in which the interfaces are held or in which the connectors are held if there is no interface. The optical connector can be, for instance an integral break/lock 30. The N interfaces include a first interface in communication with the first fiber and the second fiber, and a second interface in communication with the first fiber and the second fiber.

The switch 10 preferably includes a first optical connector, a first slot and a third interface which fits into the first slot that the first optical connector fits in until it is removed so the third interface and communicates with the first fiber and the second fiber. The first path preferably includes a power supply attached to the chassis 14 and in electrical connection to each slot. The power supply powers the first, second and third interfaces when the first, second and third interfaces are fitted in the respective slots. The first interface passes the optical signals on the first fiber and the second fiber that is not directed to it onto the other interfaces fitted in the chassis 14. Preferably, the third interface has an ID which it sends along the first fiber and the second fiber to the first and second interfaces fitted to the chassis 14 so the first and second interfaces can identify the third interface, and the third interface receives the IDs of the first and second interfaces. Preferably, if the first fiber fails, the optical signals will still reach the desired interface through the second fiber.

Each interface preferably includes a multichannel optical receiver 42 for receiving optical signals from the network 12, and a multichannel optical transmitter 40 for transmitting optical signals to the network 12, a channel tuned receiver 42 for receiving optical signals from the first and second fibers, a channel tuned transmitter 40 for sending optical signals to the first and second fibers, a multiplexer in communication with the channel tuned transmitter 40 for multiplexing optical signals from the channel tuned transmitter 40 to the first and second fibers, and a demultiplexer in communication with the channel tuned receiver 42 for demultiplexing digital signals from the first and second fibers. Preferably, the multi-channel optical receiver 42 determines a destination address for the optical signals it receives and sends the optical signals to an appropriate channel of the channel tuned transmitter 40 to be transferred to the first and second fibers.

The present invention pertains to a method for directing the optical signals in a telecommunications network 12. The method comprises the steps of receiving the optical signals at a first interface of a switch 10. There is the step of sending the optical signals onto a first optical fiber 48 in a first direction 20 and a second optical fiber 50 in a second direction 24 of the switch 10 from the first interface. There is the step of receiving at a second interface of the switch 10 the optical signals from the first fiber and the second fiber There is the step of transferring the optical signals from the second interface to a desired destination. Preferably, the method includes the steps of removing an optical connector in communication with the first optical fiber 48 and the second optical fiber 50 from a first slot of a chassis 14 of the switch 10. There is the step of inserting a third interface into the first slot so it communicates with the first fiber and the second fiber.

The method preferably includes the step of sending an ID of the third interface from the third interface onto the first fiber and the second fiber to the first interface and the second interface fitted to the chassis 14 so the first interface and the second interface can identify the third interface and send the optical signals to the third interface through the first fiber and the second fiber. Preferably, the method as described in claim 13 including the step of sending an ID of the first interface and an ID of the second interface from the first interface and the second interface, respectively, onto the first fiber and the second fiber to the third interface so the third interface can identify the first interface and the second interface and send optical signals to the first interface and the second interface.

The method preferably includes the step of receiving optical signals by the first interface sent by the third interface from the first fiber even though the second fiber has failed. Preferably, the method is described in claim 15 including the steps of determining by a multi channel optical receiver 42 of the first interface the destination address for the optical signals the first interface has received from the network 12; and sending the optical signals to an appropriate channel of a channel tuned transmitter 40 of the first interface to be transferred to the first fiber and second fiber.

In the operation of the invention, FIG. 1 shows a link having a first optical fiber 48 and at least a second optical fiber 50. The path of the optical signal in the fibers may not be traveling in the same direction. The hinges/slides are set up in such a way as to allow the integral break/lock 30 to be moved. When a new transmitter 40 receiver 42 board 38 is to be added to the switch 10, the integral break/lock 30 is moved to the rear or off of the optical paths so the transmitter 40 receiver 42 board 38 can fit into the optical paths of the switch 10, as shown in FIGS. 2 and 3.

This is accomplished by the feeds 34 being spread apart and the link slid away from the into integral break/lock 30 so the integral break/lock 30 can be separated from the optical paths and removed. The transmitter 40 receiver 42 board 38 is then positioned into the optical paths where the integral break/lock 30 had been disposed. When the transmitter 40 receiver 42 board 38 is properly in position, the feeds 34 are released and moved back into place from the force of springs 36 against which they have pressed when they were separated from the integral break/lock 30. The springs 36 are positioned about the optical paths attached to the feeds 34 and submit and to the housing of switch 10.

The surfaces of the ends of the optical fibers of the optical paths and the surfaces of the ends of the optical path segments of the board 38 are ground to be an conformance with each other by preferably being formed into opposing angles so that together they form a continuous whole fiber, respectively, to ensure proper contact and connection. Preferably, optical gel 72 is placed on the surfaces of the ends of the optical fibers and optical fiber segments to more completely couple them together for minimal loss of the optical signals passing therebetween.

Locator pins 44 align the board 38 for insertion into the optical paths, as shown in FIG. 4. Load/unload slides on each side 32 of the board 38, are aligned with the hinge/slide 28 on each feed 34. The locator pins 44 along with the unload/load slides 46 on the side 32 of the board 38, when positioned with the respective hinge/slide 28 cause the transmitter 40 receiver 42 board 38 to be guided into proper position and held in place in the optical paths. To facilitate this movement, prongs connected to each side 32 of the unload/load slide 46 are squeezed toward each other to compress slightly the unload/load slides 46 to make it easier for the board 38 to move into place in the hinges/slides. When the board 38 is properly positioned, the prongs are released, allowing the unload/load slides 46 to expand into the hinges/slides and be held there.

Before inserting the board 38, a polisher board 38 can be inserted into and then removed from the optical paths so any dust is removed by the polisher boards 38 from the optical paths where the integral break/lock 30 was positioned. This is commonly done if the integral break/lock 30 has been positioned in the optical path for over a given period, such as one month. When the boards 38 are shipped to the switch 10, they are shipped with a seal over the fiber interconnects to protect them. The seal is removed before the insertion of the transmitter 40 receiver 42 board 38 into the optical paths, which protects against contamination. Once inserted, the transmitter 40 receiver 42 board 38 immediately begins an internal check out including testing that the optical interfaces have been properly formed.

The transmitter 40 receiver 42 board 38 has a tunable laser 62 which transmits the data that has been received by the board 38 from an external source, such as the network 12, as shown in FIGS. 5 and 6. There is a Lambda control on the board 38 connected to the tunable laser 62 which controls the frequency at which the data is sent onto the first optical fiber 48. Each connection has a unique frequency at which its data of the connection is sent along the first optical fiber 48. The tunable laser 62 is connected to a fiber drive 64 which takes the signal from the laser 62 and places it into a form so that it can flow along the first optical fiber 48, as is well-known in the art. The fiber drive 64 is connected to a fiber mirror 60 which couples the data from the fiber drive 64, as well known who in the art.

The fiber mirror 60 also serves to couple the data flowing along the first optical fiber 48 to the transmitter 40 receiver 42 board 38, as is well-known in the art. The data flowing along the first optical fiber 48 at all the various frequencies corresponding to the various connections being switched by the switch 10, is reflected by the mirror 60 onto a fiber drop 68, as is well known in the art. The fiber drop 68 is connected to a Lambda filter 66 which breaks out the data corresponding to its frequency so that all the connections that are to be received and processed by the transmitter 40 receiver 42 board 38 can be processed by a receiver 42 of the transmitter 40 receiver 42 board 38. The Lambda filter 66 is connected to the receiver 42 on the board 38 which takes the data and processes it for the next stage of its journey. This next stage can be storage until an output port on the board 38 to the network 12 is available for the transmission of the data to the network 12, or the elimination of the data since it does not correspond to connections that are to be processed by the board 38.

The transmitter 40 receiver 42 board 38 has an identical structure and operation in regard to the second optical fiber 50 and the transmission and reception of data with respect to the second optical fiber 50.

Figure 7:
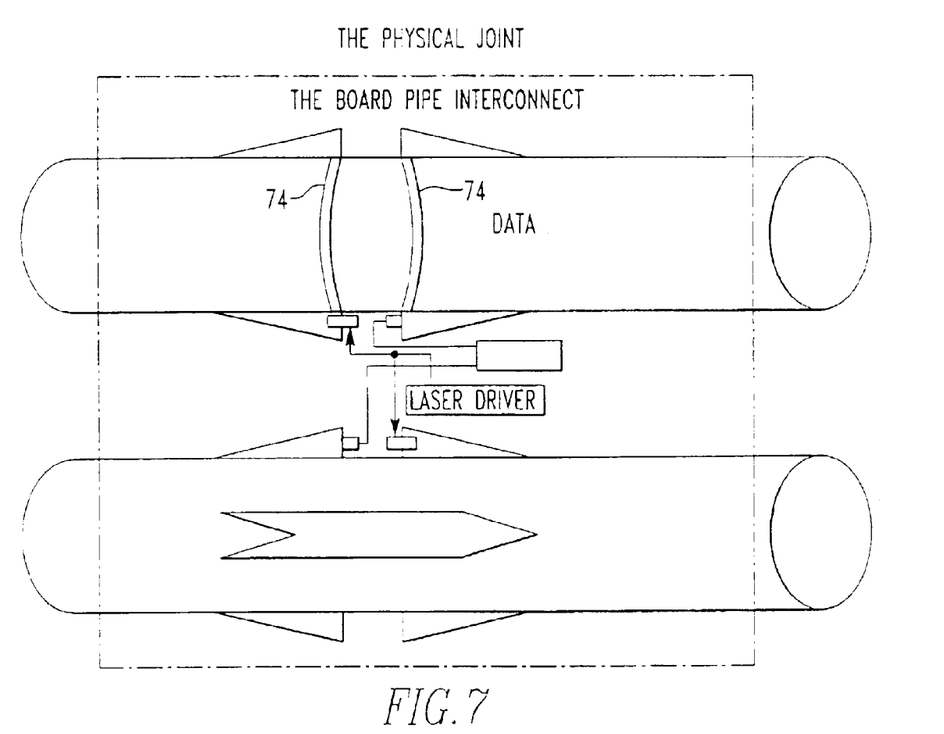
FIG. 7 is a schematic representation of an alternative embodiment of the printed circuit board assembly interconnected with the first and second optical paths.
Figure 8:
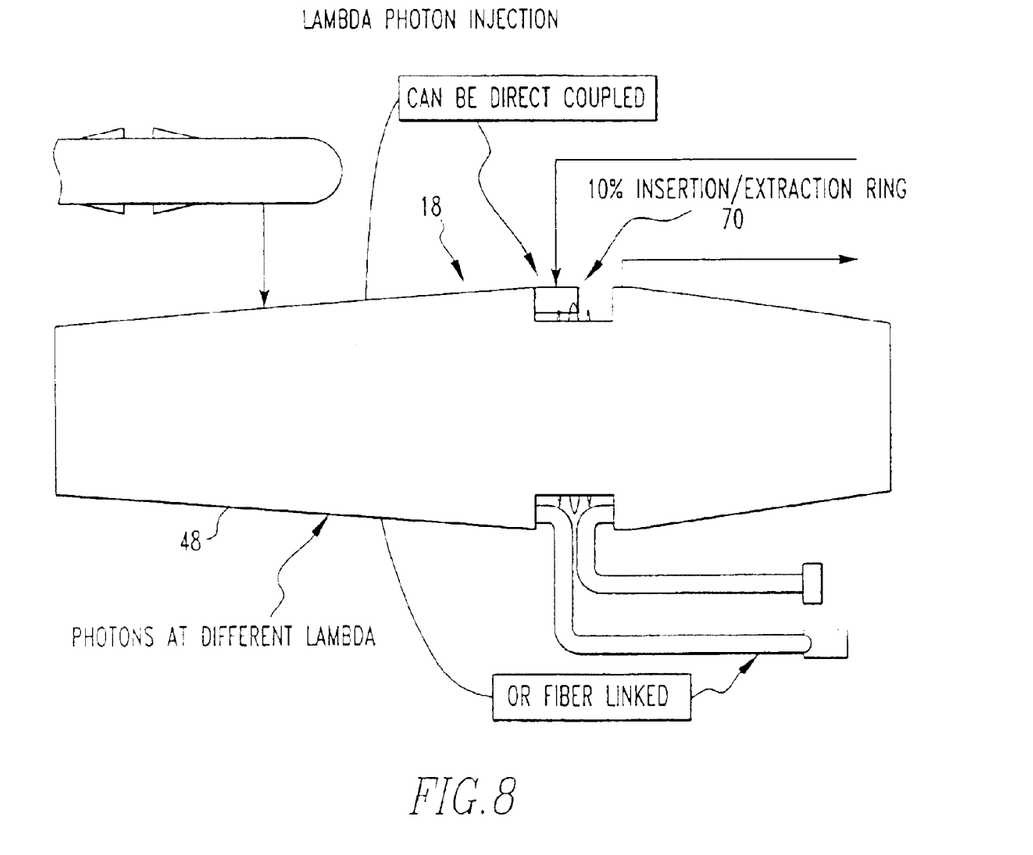
FIG. 8 is a schematic representation of the insertion/extraction of photons at different Lambdas with respect to the alternative embodiment regarding an optical path.

In an alternative embodiment, as shown in FIGS. 7 and 8, there is a cone which is an optical waveguide, that is disposed in the first optical fiber segment 52, and another cone disposed in the second optical fiber segment 54. The cone is fabricated with the optical fiber segment. The receiver 42 and the transmitter 40 of the board 38 is directly coupled to the cone to receive or transmit photons at different lambdas from or to the respective optical fiber segment. As the photons of the different Lambdas travel along the respective optical fiber segment and pass through the cone, a portion 26 will also reflect in the cone down to the receiver 42 of the board 38, as described above, and be processed. Similarly, photons produced by the laser 62 driver are transmitted into the cone where they reflect along the cone across the respective optical fiber segments. As they reflect along the cone along the respective optical fiber segment, a portion 26 also refracts through the cone into the respective optical fibers segment, where it flows along the respective optical path. The photons are introduced into or extracted from the cone at about a 15 degree angle for the above to occur. As explained, the transmitter 40 and receiver 42 of the board 38 can be directly coupled to the cone, or the transmitter 40 and receiver 42 can be fiber linked to the cone for the photons to be introduced to or extracted from or to the cone.

The switch 10 includes a multi-channel optical receiver(s) 42, multi-channel transmitter 40, de-multiplexer, channel tuned receiver(s) 42, channel tuned transmitter(s) 40, optical fiber, auto-mechanical optical connector, multiplexer. The transmitter 40 and receiver 42 ride on a board 38 and receive optical information in a similar manner to the add drop multiplexer in a PMA32 system. This is a much smaller application and does not require the high power lasers 62 or control used in the ADM and transponders involved with the PMA32.

When an interface card is plugged into a location in the chassis/rack, it makes electrical contact and opens the pass-through optical connector at the backplane 11 side 32 of the board 38. It powers up and continues to pass the information that is not directed to it on to the other cards in the chassis/rack.

There is no interruption in service as the backplane 11 optics are two fibers with data traveling in opposite directions. During the seating and power up operation, the net, to accomplish its task, uses alternate paths.

The card then initializes by sending its information and ID across the internal net for the other interface (port) boards 38 to identify. At the same time, the inserted board 38 acquires the ID and necessary code to access the other boards 38.

When data arrives, it gives up a destination address that is interrupted, sent to the I/O area and an appropriate channel of the laser 62 and then the data is sent along the optical fibers.

Figure 9:
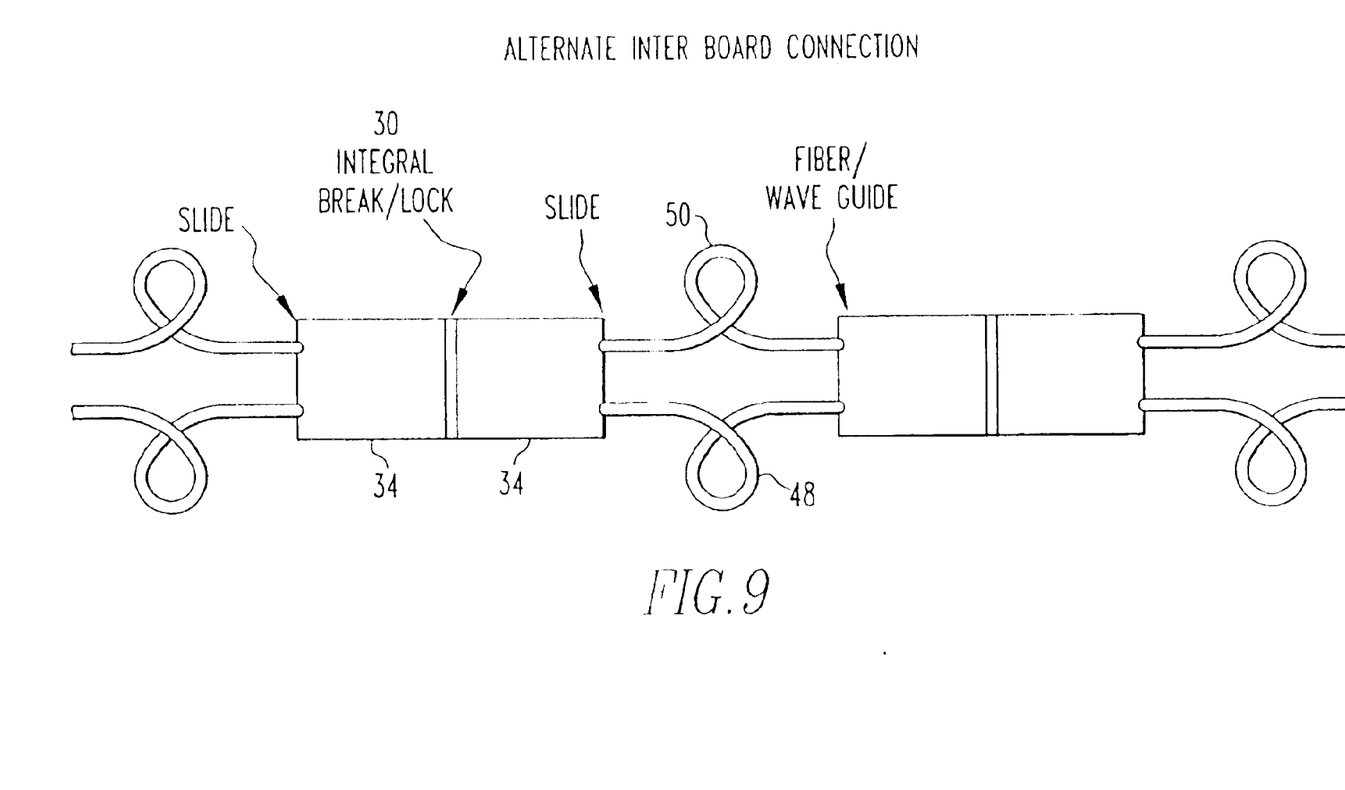
FIG. 9 is a schematic representations of an alternative embodiment of a printed circuit board assembly connection with the first and second optical paths.

In an alternative embodiment of the interboard connection, and as shown in FIG. 9, the integral break/lock 30 has no length. The feeds 34 connect to each other through the integral break/lock 30, and slide apart, as explained above.

Waveguide ring resonators can be used to insert and extract a desired frequency, or lambda, into the first and second fibers.

Figure 10:
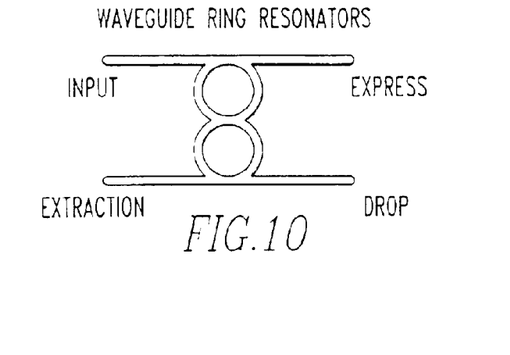
FIG. 10 is a schematic representation of waveguide ring resonators.
Figure 11:
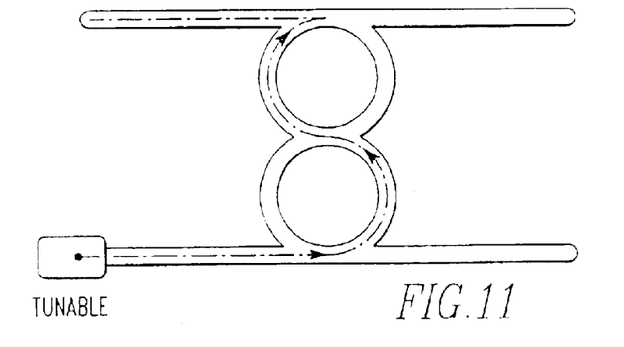
FIG. 11 is a schematic representation of waveguide ring resonators.
Figure 12:
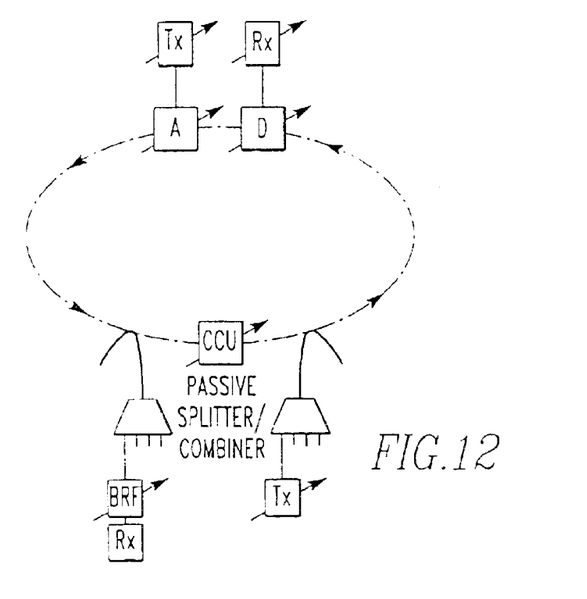
FIG. 12 is a schematic representation of a ring with the filter functions utilizing the waveguide ring resonators.

Referring to FIGS. 10–12, on the input is all of the lambdas that are on the fiber. The target channel or lambda is set by a tunable laser on the extraction ring. The signal is injected at the extraction in the opposite phase of the lambda on the input resulting in elimination of the signal on the express out. At the junction of the 2 rings, the phases are in harmony resulting in a signal of the target lambda on the drop line. For insertion, since there is no lambda on the first and second fibers that notches the lambda being inserted, the lambda is inserted directly at the input or at the extraction, and thus present on the express out. See U.S. patent application Ser. No. 09/734,495, incorporated by reference herein, for a more complete description of the insertion and extraction of a lambda.

The waveguide ring resonators are suitable for use as two port and three port filters. The bandwidth can be less than a fixed filter it the filter can track laser wavelength. With the waveguide ring resonators.

Waveguide ring resonators
    thermal or electro-optic tuning, turns off resonant filtering effect during tuning of filter
    only one filter required for each wavelength to be dropped (i.e. n, not m filters)
There can alternatively be used MEMs multiple Fabry-Perot cavity that offer:
    electrostatic tuning, turns off resonant filtering effect during tuning of filter only one filter required for each wavelength to be dropped (i.e. n, not m filters)

There can alternatively be used Vernier FBGs (two port only) that offer:
  mechanical tuning, grating mismatch during tuning
  needs two gratings and two FBGS, so lossy device
  only one filter required for each wavelength to be dropped (i.e. n, not m filters)
  suppliers: CiDra The MEMs and FBGs are well known to one skilled in the art.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switch for directing optical signals in a telecommunications network comprising:
  an optical backplane having a first optical path along which the optical signals flow in a first direction and at least a second optical path along which optical signals flow in a second direction, the first path forms a closed continuous loop and the second path forms a closed continuous loop, the first path includes a first optical fiber and the second path includes a second optical fiber;
  N interfaces, where N is greater than or equal to 2 and is an integer, each interface in optical communication with the network, each interface receiving optical signals from and transferring optical signals to the network, each interface in optical communication with the first path and the second path, each interface sending optical signals it receives from the network onto the first path and the second path, each interface transferring optical signals to the network it receives from the first path and the second path; and
  optical connectors through which optical signals from the first fiber and the second fiber can flow and a chassis having slots in which the interfaces are held or in which the connectors are held if there is no interface, and wherein the N interfaces include a first interface in communication with the first fiber and the second fiber, and a second interface in communication with the first fiber and the second fiber.

2. A switch as described in claim 1 including a first optical connector, a first slot and a third interface which fits into the first slot that the first optical connector fits in until it is removed so the third interface and communicates with the first fiber and the second fiber.

3. A switch as described in claim 2 including a power supply attached to the chassis and in electrical connection to each slot, the power supply powering the first, second and third interfaces when the first, second and third interfaces are fitted in the respective slots, the first interface passing the optical signals on the first fiber and the second fiber that is not directed to it onto the other interfaces fitted in the chassis.

4. A switch as described in claim 3 wherein the third interface has an ID which it sends along the first fiber and the second fiber to the first and second interfaces fitted to the chassis so the first and second interfaces can identify the third interface, and the third interface receives the IDs of the first and second interfaces.

5. A switch as described in claim 4 wherein if the first fiber fails, the optical signals will still reach the desired interface through the second fiber.

6. A switch as described in claim 5 wherein each card includes a multichannel optical receiver for receiving optical signals from the network, and a multichannel optical transmitter for transmitting optical signals to the network, a channel tuned receiver for receiving optical signals from the first and second fibers, a channel tuned transmitter for sending optical signals to the first and second fibers, a multiplexer in communication with the channel tuned transmitter for multiplexing optical signals from the channel tuned transmitter to the first and second fibers, and a demultiplexer in communication with the channel tuned receiver for demultiplexing digital signals from the first and second fibers.

7. A switch as described in claim 6 wherein the multichannel optical receiver determines a destination address for the optical signals it receives and sends the optical signals to an appropriate channel of the channel tuned transmitter to be transferred to the first and second fibers.

8. A method for directing the optical signals in a telecommunications network comprising the steps of:
  receiving the optical signals at a first interface of a switch;
  sending the optical signals onto a first optical fiber in a first direction and a second optical fiber in a second direction of the switch from the first interface;
  receiving at a second interface of the switch the optical signals from the first fiber and the second fiber;
  transferring the optical signals from the second interface to a desired destination;
  removing an optical connector in communication with the first optical fiber and the second optical fiber from a first slot of a chassis of the switch; and
  inserting a third interface into the first slot so it communicates with the first fiber and the second fiber.

9. A method as described in claim 8 including the step of sending an ID of the third interface from the third interface onto the first fiber and the second fiber to the first interface and the second interface fitted to the chassis so the first interface and the second interface can identify the third interface and send the optical signals to the third interface through the first fiber and the second fiber.

10. A method as described in claim 9 including the step of sending an ID of the first interface and an ID of the second interface from the first interface and the second interface, respectively, onto the first fiber and the second fiber to the third interface so the third interface can identify the first interface and the second interface and send optical signals to the first interface and the second interface.

11. A method as described in claim 10 including the step of receiving optical signals by the first interface sent by the third interface from the first fiber even though the second fiber has failed.

12. A method as described in claim 11 including the steps of determining by a multi-channel optical receiver of the first interface the destination address for the optical signals the first interface has received from the network; and sending the optical signals to an appropriate channel of a channel tuned transmitter of the first interface to be transferred to the first fiber and second fiber.

13. A method for directing optical signals in a telecommunications network comprising the steps of:
  receiving optical signals from the network at N interfaces, where N is greater than or equal to 2 and is an integer, each interface in optical communication with the network;
  sending optical signals from each interface that each interface receives from the network onto a first optical path and a second optical path of an optical backplane;

flowing the optical signals along the first optical path in a first direction and along at least the second optical path in a second direction opposite the first direction, each interface in optical communication with the first path and the second path;

transferring optical signals to the network from each interface that each interface receives from the first path and the second path;

removing an optical connector in communication with the first optical path and the second optical path from a first slot of a chassis; and inserting a third interface into the first slot so it communicates with the first fiber and the second fiber.

* * * * *